United States Patent
Ebihara

(10) Patent No.: US 9,302,711 B2
(45) Date of Patent: Apr. 5, 2016

(54) VEHICLE BODY REAR STRUCTURE

(71) Applicant: HONDA MOTOR CO., LTD., Tokyo (JP)

(72) Inventor: Daisuke Ebihara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/421,514

(22) PCT Filed: Jun. 25, 2013

(86) PCT No.: PCT/JP2013/067333
§ 371 (c)(1),
(2) Date: Feb. 13, 2015

(87) PCT Pub. No.: WO2014/034239
PCT Pub. Date: Mar. 6, 2014

(65) Prior Publication Data
US 2015/0183467 A1    Jul. 2, 2015

(30) Foreign Application Priority Data
Aug. 31, 2012  (JP) ................................. 2012-191554

(51) Int. Cl.
*B62D 25/08* (2006.01)
*B62D 25/02* (2006.01)
*B62D 25/04* (2006.01)

(52) U.S. Cl.
CPC .............. *B62D 25/08* (2013.01); *B62D 25/02* (2013.01); *B62D 25/04* (2013.01); *B62D 25/087* (2013.01)

(58) Field of Classification Search
CPC ............................ B62D 25/08; B62D 25/087

USPC ............... 296/187.11, 193.08, 203.04, 30
See application file for complete search history.

(56) References Cited

U.S. PATENT DOCUMENTS

| | | | | |
|---|---|---|---|---|
| 5,611,592 A | * | 3/1997 | Satou | B62D 25/087 296/203.04 |
| 8,690,227 B2 | * | 4/2014 | Matsuoka | B62D 21/155 296/187.09 |
| 2013/0169005 A1 | * | 7/2013 | Okamachi | B62D 25/08 296/193.08 |

FOREIGN PATENT DOCUMENTS

| | | |
|---|---|---|
| DE | 102006015415 A1 * | 12/2007 |
| JP | H08-006688 | 2/1996 |

(Continued)

OTHER PUBLICATIONS

International Search Report, Date of mailing: Sep. 24, 2013.

*Primary Examiner* — Jason S Morrow
(74) *Attorney, Agent, or Firm* — Rankin, Hill & Clark LLP

(57) ABSTRACT

A vehicle body rear structure is provided with a rear panel stiffener including a stiffener L-shaped sectional portion, a rear girder including an inner L-shaped sectional portion, and a corner panel configured from an upper stiffener extension and a rear panel side extension. The stiffener L-shaped sectional portion has a first ridge line, and the inner L-shaped sectional portion has a second ridge line. The upper stiffener extension is provided with an upper L-shaped sectional portion that is continuous with the respective L-shaped sectional portions, and has a third ridge line that is contiguous with the respective ridge lines. The rear panel side extension is provided with a bulkhead that partitions a corner closed sectional portion.

20 Claims, 9 Drawing Sheets

(56) References Cited

FOREIGN PATENT DOCUMENTS

| JP | 08-295265 | 11/1996 |
| JP | 2000-016338 | 1/2000 |
| JP | 2003-200858 | 7/2003 |
| JP | 2009-208610 | 9/2009 |

* cited by examiner

VEHICLE BODY REAR STRUCTURE

TECHNICAL FIELD

The present invention relates to a vehicle body rear structure including a rear outer wall provided at a rear part of a vehicle body, a rear girder raised upward from the rear outer wall, and a corner panel provided at a junction between the rear outer wall and the rear girder.

BACKGROUND ART

Vehicle body rear structures include a rear outer wall raised upward from a rear end of a rear floor panel forming a floor of a vehicle body such that the rear outer wall defines a rear part of a trunk room (cabin). The rear outer wall has a hollow closed section formed by and between a rear panel outer member and a rear panel inner member raised from the rear end of the rear floor panel (see, for example, Patent Document 1).

However, since the hollow closed section formed by the rear panel outer member and the rear panel inner member of the rear outer wall shown in Patent Document 1 is relatively large, the rear outer wall can hardly secure sufficient rigidity and strength and is likely to undergo collapsing deformation when subjected to a load. It is, therefore, necessary to devise an appropriate means of protecting the rear outer wall against undergoing collapsing deformation.

In the vehicle body rear structure, the rear girder is connected to a lateral outer end of the rear outer wall and also connected to a roof side rail. By thus connecting the rear girder to the lateral outer end of the rear outer wall, an upper part of the rear outer wall and the rear girder jointly form part of a rear opening of the cabin. With this arrangement, the rear outer wall having a relatively large hollow closed section is hardly possible to perform proper load transmission between itself and the rear girder. An appropriate means of transmitting a load between the rear outer wall and the rear girder is also required.

As a measure to prevent a collapsing deformation of the rear outer wall while securing appropriate load transmission between the rear outer wall and the rear girder, it may be considered that a bulkhead is disposed inside the rear outer wall so as to partition a closed section of the rear outer wall. By thus partitioning the closed section of the rear outer wall, necessary rigidity and strength of the rear outer wall can be maintained. However, the bulkhead disposed inside the rear outer wall brings about an increase in the number of structural components and renders the rear outer wall complicated in construction.

PRIOR ART LITERATURE

Patent Literature

Patent Document 1: Japanese Patent Application Laid-open Publication (JP-A) No. 2009-208610.

SUMMARY OF INVENTION

Technical Problem

It is an object of the present invention is to provide a vehicle body rear structure which is capable of suppressing an increase in the number of components and also securing desired rigidity and strength of a rear outer wall (vehicle body rear part).

Solution to Problem

According to one aspect of the present invention, there is provided a vehicle body rear structure comprising: a rear panel outer member raised upward from a rear end of a floor panel of a vehicle body and forming a rear outer wall that partitions a cabin from the outside of the vehicle body; a rear panel stiffener joined to an inner surface of the rear panel outer member so as to form, together with the rear panel outer member, a lower closed sectional portion extending in a vehicle width direction at a lower edge of a rear opening of the vehicle body; a rear girder raised upward from a lateral outer side of the rear panel outer member and forming a side closed sectional portion extending vertically along a lateral side edge of the rear opening; and a corner panel joined with the rear panel outer member and the rear girder so as to form a corner closed sectional portion continuously interconnecting the lower closed sectional portion and the side closed sectional portion at a recessed corner portion of the rear opening. The rear panel stiffener includes an L-shaped sectional portion formed by an upper surface extending from an opening flange of the rear opening toward a front side of the vehicle body and a vertical surface extending vertically downward from a front end of the upper surface with a first ridge line formed between the vertical surface and the front end of the upper surface. The rear girder includes an L-shaped sectional portion formed by a side surface extending from the opening flange of the rear opening toward the front side of the vehicle body, and an extension surface extending from a front end of the side surface with a second ridge line formed between the extension surface and the front end of the side surface. The corner panel includes: an upper stiffener extension having an L-shaped sectional portion continuous with respective L-shaped sectional portions of the rear panel stiffener and the rear girder, the L-shaped sectional portion of the upper stiffener extension having a third ridge line continuous with the first ridge line and the second ridge line; and a rear panel side extension defining the corner closed sectional portion jointly with the upper stiffener extension and including a bulkhead partitioning the corner closed sectional portion into a plurality of closed sectional parts.

In one preferred form of the invention, the bulkhead is disposed so as to be continuous with the upper surface of the rear panel stiffener.

It is preferable that the rear panel outer member includes a major surface section disposed substantially vertically, and a bent surface section disposed on a lateral outer side of the major surface section and bent from the major surface section toward the front side of the vehicle body, wherein the upper stiffener extension has a gun-insertion hole so as to allow the rear panel outer member and the rear panel side extension to be spot-welded together, and wherein the rear panel side extension has a first flange joined across the major surface section and the bent surface section.

Preferably, the rear panel side extension has a second flange sandwiched between and joined to an outer flange at an upper end of the rear panel outer member and an upper flange of the upper stiffener extension.

It is preferable that the rear panel side extension has a horizontal step extending in the vehicle width direction, and the rear panel outer member has a horizontal bead extending in the vehicle width direction, the horizontal step and the horizontal bead being horizontally aligned with each other.

Preferably, the upper stiffener extension has one or more vertical beads, and the rear panel side extension has a corresponding number of vertical beads, each of the vertical beads of the upper stiffener extension and a respective one of the vertical beads of the rear panel side extension being coincident with each other.

Preferably, the rear panel outer member has a first outer ridge line extending in the vehicle width direction, and a second outer ridge line disposed below the first ridge line and extending in the vehicle width direction, and the rear panel side extension includes a bulged portion extending in such a manner as to swell up between the first outer ridge line and the second outer ridge line.

Advantageous Effects of Invention

In the vehicle body rear structure according to the first aspect of the present invention, the L-shaped sectional portion of the upper stiffener extension is continuous with the L-shaped sectional portion of the rear panel stiffener and the L-shaped sectional portion of the rear girder such that the first ridge line, the second ridge line and the third ridge line are continuous with one another. With this arrangement, load transmission between the rear panel stiffener and the rear girder can be achieved smoothly and appropriately through the L-shaped sectional portion (third ridge line) of the upper stiffener extension. As a result, the load transmission efficiency between the rear panel stiffener and the rear girder increases and the rigidity and strength of the rear outer wall (vehicle body rear part) can be enhanced.

Furthermore, since the bulkhead provided on the rear panel side extension partitions the corner closed sectional portion into a plurality of closed sectional parts, the corner closed sectional portion (i.e., the rear outer wall) has an increased yield strength against collapsing deformation. This arrangement will add to an improvement in the rigidity and strength of the rear outer wall (vehicle body rear part).

Additionally, by virtue of the bulkhead disposed so as to be continuous with the upper surface of the rear panel stiffer, load transmission from the upper surface of the rear panel stiffener to the bulkhead can be achieved smoothly and appropriately. This will lead to a further increase in the load transmission efficiency between the rear panel stiffener and the rear panel side extension and a further enhancement of the rigidity and strength of the rear outer wall (vehicle body rear part).

The gun-insertion hole formed in the upper stiffener extension allows an electrode for the spot-welding to be inserted in the interior of the corner closed sectional portion formed jointly by the upper stiffener extension and the rear panel side extension. With this arrangement, the rear panel outer member and the rear panel side extension can be spot-welded together from an interior side of the corner closed sectional portion.

Furthermore, by virtue of the rear panel side extension having the first flange joined across the major surface section and the bent surface section of the rear panel outer member, the major surface section and the bent surface section are reinforced by the first flange, which will bring about a further increase in the rigidity and strength of the rear panel outer member.

Additionally, because the rear panel side extension has the second flange which is sandwiched between and joined to the outer flange of the rear panel outer member and the upper flange of the upper stiffener extension, the second flange is firmly supported by the outer flange and the upper flange and, hence, possesses an enhanced bonding strength. With the second flange thus arranged, the rigidity and strength of the rear panel side extension can be enhanced.

Furthermore, since the horizontal step of the rear panel side extension and the horizontal bead of the rear panel outer member are horizontally aligned with each other, this arrangement contributes to a further enhancement of the rigidity and strength of the rear outer wall (vehicle body rear part).

Additionally, by virtue of the vertical beads of the upper stiffener extension being coincident with the vertical beads of the rear panel side extension, a still further enhancement of the rear outer wall (vehicle body rear part) can be achieved.

Furthermore, because of the bulged portion of the rear panel side extension extending in such a manner as to swell up between the first and second ridge lines of the rear panel outer member, the first and second ridge lines are reinforced by the bulged portion to the extent that the first and second ridge lines is prevented from moving in direction to approach each other. The bulged portion provided between the first and second ridge lines adds to a further enhancement of the rigidity and strength of the rear outer wall (vehicle body rear part).

DESCRIPTION OF EMBODIMENTS

Figure 1:
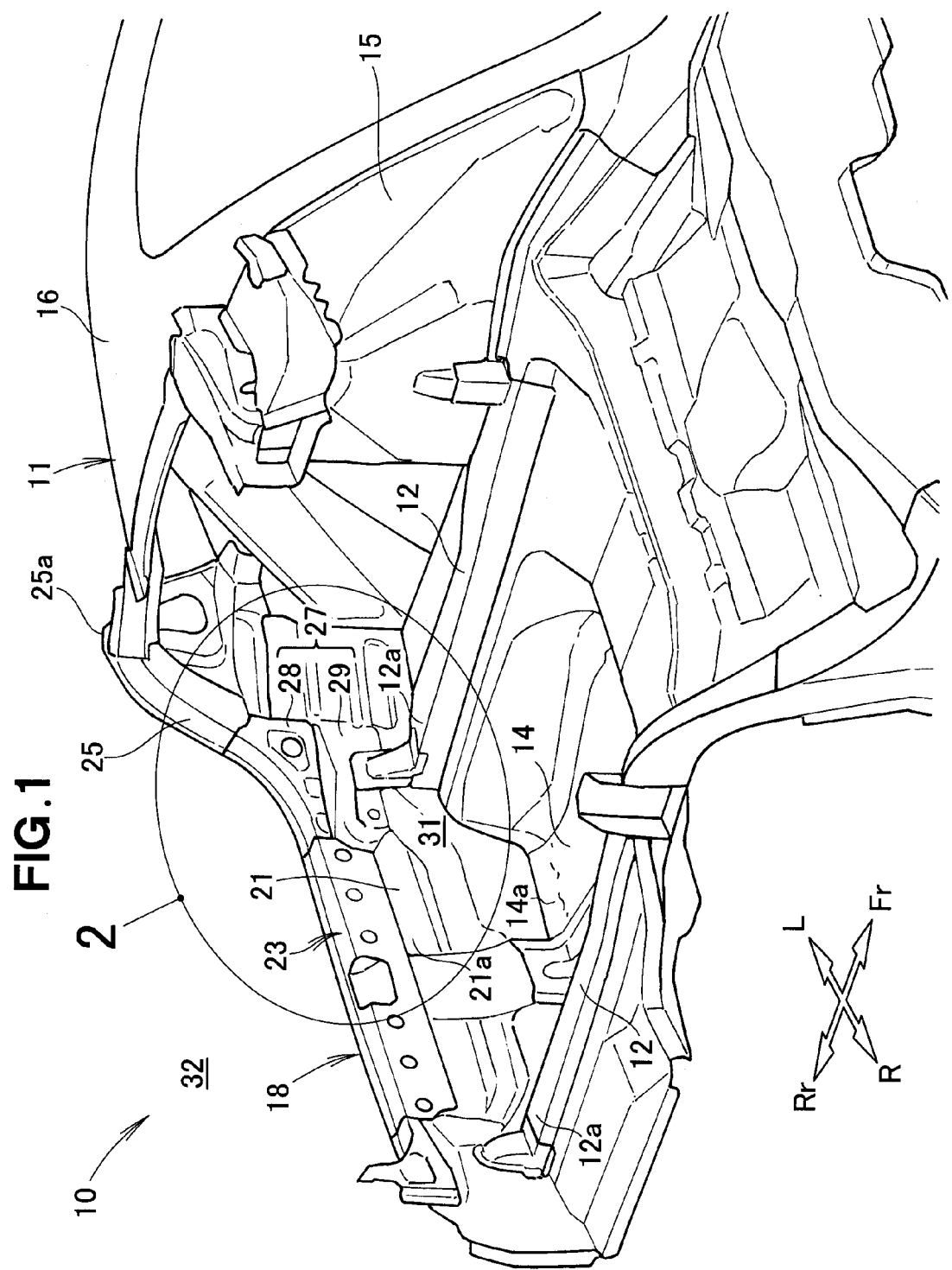
FIG. 1 is a perspective view of a vehicle body rear structure according to the prevent invention as viewed from a cabin.

A certain preferred embodiment of the present invention will be described in greater detail below with reference to the accompanying drawings. In the drawings and following description, the terms "front (Fr)", "rear (Rr)", "left (L)" and "right (R)" are used to refer to directions as viewed from the driver of a vehicle.

Embodiment

As shown in FIG. 1, a vehicle body rear structure 10 includes left and right rear side frames 12, 12 disposed on left and right sides of a vehicle body 11 with a predetermined space defined therebetween, a rear floor panel 14 provided between the left and right side frames 12, 12 and forming a floor of the vehicle body 11, a left wheelhouse 15 provided on the left rear side frame 12, and a right wheelhouse provided on the right rear side frame 12. A left rear pillar 16 and a right rear pillar are disposed above the left wheelhouse 15 and the right wheelhouse, respectively.

The vehicle body rear structure 10 also includes a rear panel outer member 21 raised upward from a rear end 14a of the rear floor panel 14, a rear panel stiffener 23 joined to an inner surface (cabin interior surface) 21a of the rear panel outer member 21, a rear girder 25 raised upward from a lateral outer side of the rear panel outer member 21, and a corner panel 27 joined to the rear panel outer member 21 and the rear girder 25.

The rear panel outer member 21 is raised upward from the rear end 14a of the rear floor panel 14 and joined to rear ends 12a, 12a of the left and right rear side frames 12, 12. The rear panel outer member 21 is mounted to extend in a vehicle width direction at a rear part of the vehicle body 11 so as to form a rear outer wall 18. The rear outer wall 18 separates a vehicle passenger cabin 31 from the outside 32 of the vehicle.

Figure 2:
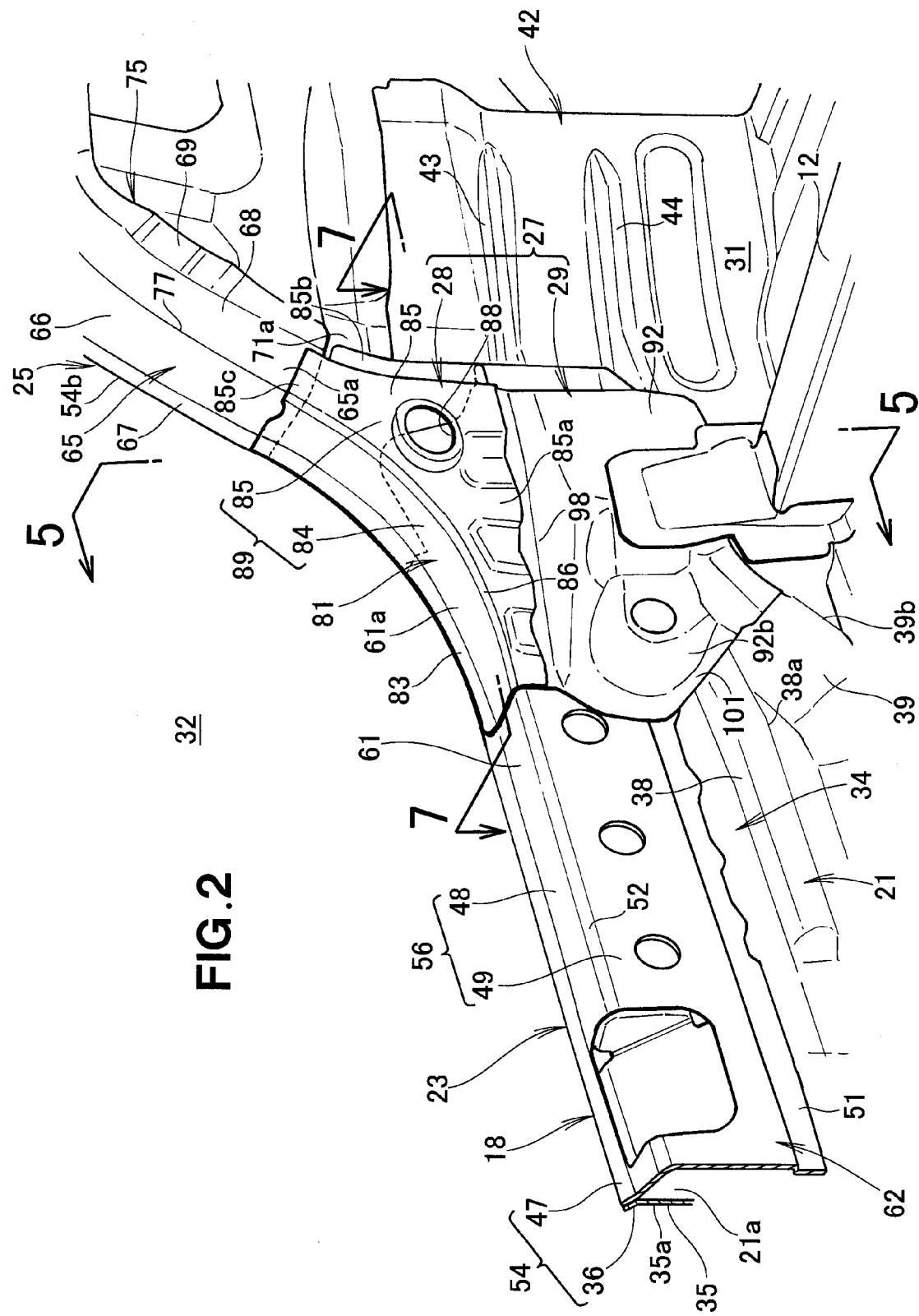
FIG. 2 is an enlarged view of a part 2 shown in FIG. 1.
Figure 3:
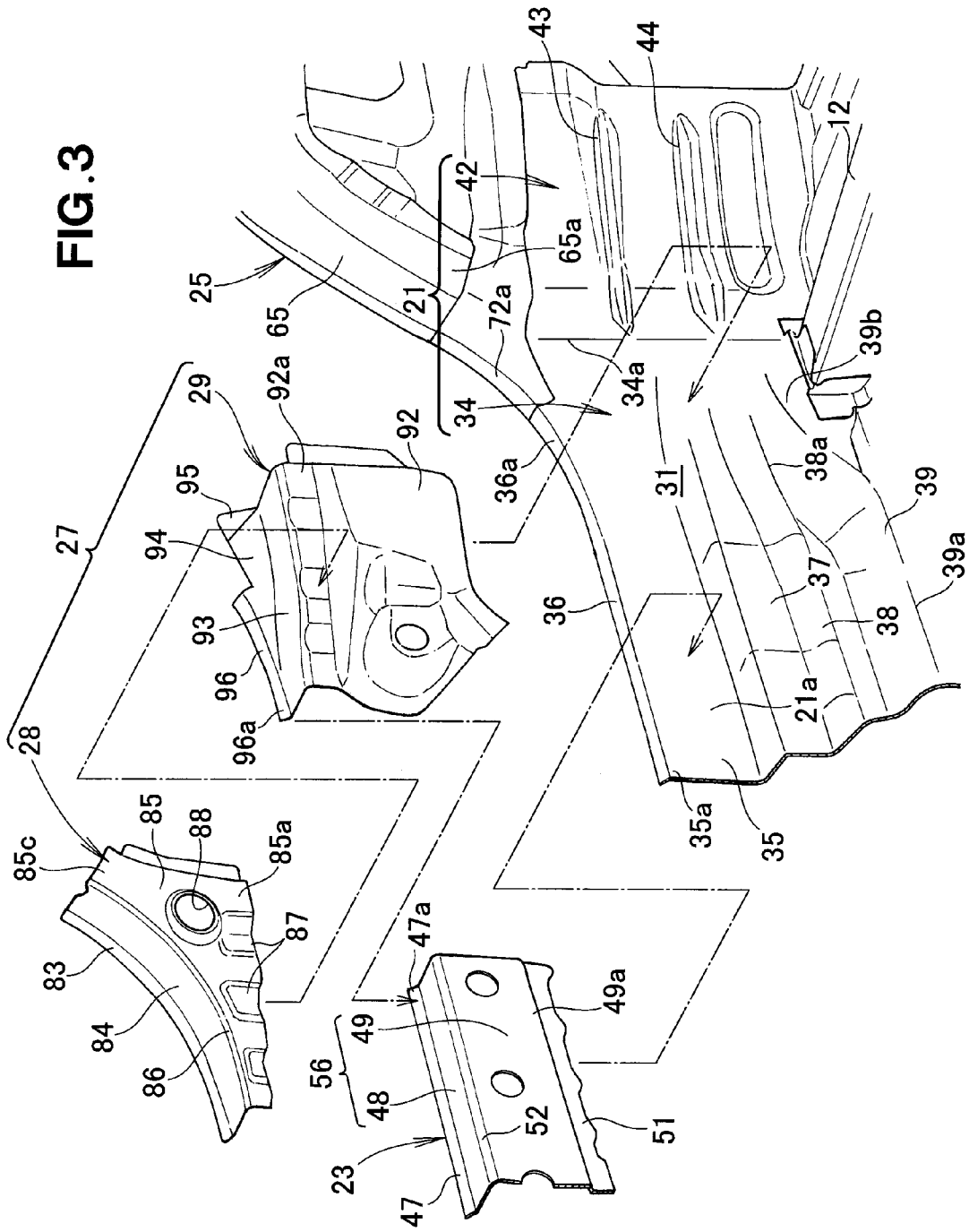
FIG. 3 is an exploded perspective view of the vehicle body rear structure shown in FIG. 2.

As shown in FIGS. 2 and 3, the rear panel outer member 21 includes a general or major surface section 34 raised from the rear end 14a (FIG. 1) of the rear floor panel 14, and left and right bent surface sections 42 (left one being shown) provided on both lateral outer sides of the major surface section 34.

The major surface section 34 is formed into a generally rectangular shape and provided to extend substantially vertically upward from the rear end 14a of the rear floor panel 14. The major surface section 34 includes an outer L-shaped sectional portion 35 formed into a generally L-shape in cross section, an outer flange 36 provided at an upper end 35a of the outer L-shaped sectional portion 35, an upper bulged portion 38 provided at a lower end of the outer L-shaped sectional portion 35, and a lower bulged portion 39 provided below the upper bulged portion 38.

The outer flange 36 is bent with an upgrade from the upper end 35a of the outer L-shaped sectional portion 35 toward a rear side of the vehicle body 11. The outer flange 36 has a curved flange part 36a at a lateral outer end thereof. The curved flange part 36a is curved to rise upward toward lateral outer side of the vehicle body.

The upper bulged portion 38 is formed to swell toward the cabin 31 and has a first outer ridge line 38a. The first outer ridge line 38a is a corner formed at a bent part of the upper bulged portion 38 and projecting toward the cabin 31. The first outer ridge line 38a extends substantially horizontally in the vehicle width direction.

The lower bulged portion 39 is formed to swell toward the cabin 31 and has a second outer ridge line 39a. The second outer ridge line 39a is a corner formed at a bent part of the lower bulged portion 39 and projecting toward the cabin 31. The second outer ridge line 39a extends substantially horizontally in the vehicle width direction and has an inclined ridge line part 39b at a lateral outer end thereof. The inclined ridge line part 39b is formed to extend with an upgrade from an intermediate portion of the second outer ridge line 39a toward the first outer ridge line 38a. The upper bulged portion 38 (first outer ridge line 38a) and the lower bulged portion 39 (second outer ridge line 39a) thus provided on the major surface section 34 of the rear panel outer member 21 are able to reinforce the rear panel outer member 21 (major surface section 34).

The bent surface section 42 is formed into a generally rectangular shape and provided on a lateral outer side of the major surface section 34 in such a manner that the bent surface section 42 extends obliquely from a lateral outer end 34a of the major surface section 34 toward a front side of the vehicle body 11. The major surface section 34 and the bent surface section 42 are bent at the lateral outer end 34a of the major surface section 34 into a generally dogleg shape in cross section (see FIG. 7). The bent surface section 42 has upper and lower horizontal beads 43, 44 spaced a predetermined distance from one other in a vertical direction. The upper and lower horizontal beads 43, 44 are formed into a concave shape which is recessed toward the rear side of the vehicle body and which extend substantially horizontally in the vehicle width direction. The bent surface section 42 provided with the upper and lower horizontal beads 43, 44 is reinforced by the upper and lower horizontal beads 43, 44.

Figure 4:
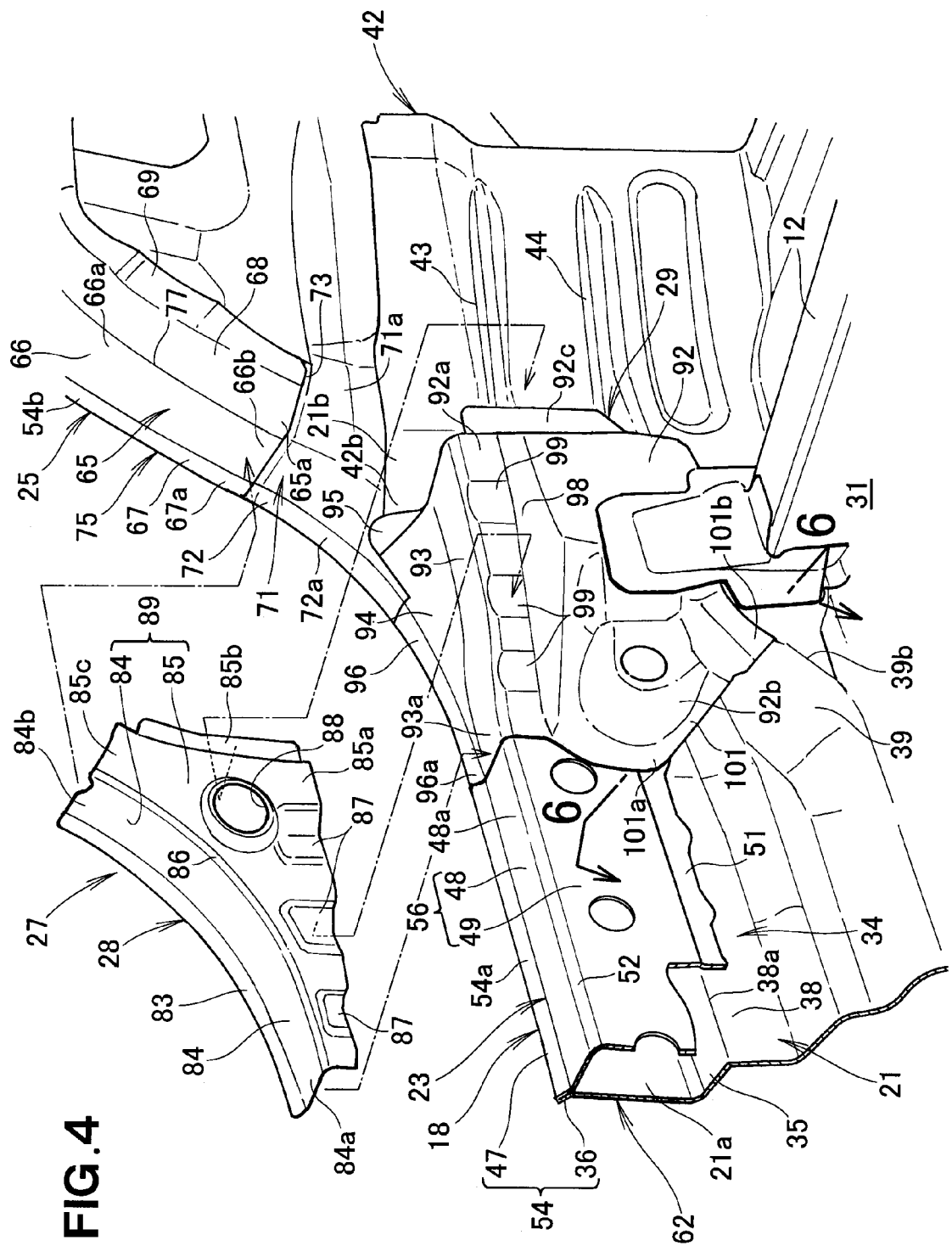
FIG. 4 is an exploded perspective view of the vehicle body rear structure of FIG. 2 with an upper stiffener extension shown in a disassembled state.

As shown in FIGS. 3 and 4, the rear panel stiffener 23 is joined to an inner surface 21a of the rear panel outer member 21 at an upper part of the rear panel outer member 21. More specifically, the rear panel stiffener 23 includes an upper flange 47 joined to the outer flange 36, an upper stiffener (upper surface) 48 extending from the upper flange 47 (opening flange 54) toward the front side of the vehicle body, a vertical stiffener (vertical surface) 49 bent downward from a front end 48a of the upper stiffener 48, and a lower flange 51 projecting downward from a lower end 49a of the vertical stiffener 49. The rear panel stiffener 23 has a first ridge line 52 formed by a bent portion between the upper stiffener 48 and the vertical stiffener 49.

The upper flange 47 is joined to the outer flange 36 from an upper side thereof so that a lower edge 54a of the opening flange 54 is formed jointly by the outer flange 36 and the upper flange 47. The opening flange 54 is a flange formed circumferentially along a rear opening 61 (FIG. 2). The rear opening 61 is formed at the rear part of the vehicle body 11 so as to open the cabin 31. The rear opening 61 is configured to be openable and closable by a trunk lid, for example.

The upper stiffener 48 is formed to be substantially horizontal. The upper stiffener 48 and the vertical stiffener 49 are bent relative to one another so as to form an L shape in cross section. The vertical stiffener 49 extends vertically downward with the first ridge line 52 formed between itself and the front end 48a of the upper stiffener 48. The first ridge line 52 is a corner projecting toward the front side of the vehicle body.

By virtue of the upper stiffener 48 and the vertical stiffener 49 bent into an L-shape in cross section, a stiffener L-shaped sectional portion (L-shaped sectional portion) 56 projecting toward the front side of the vehicle is formed. The rear panel stiffener 23 includes the stiffener L-shaped sectional portion 56 having the first ridge line 52.

The upper flange 47 is joined with the outer flange 34 such that the upper flange 47 is piled up on the outer flange 34 from above. The lower flange 51 is joined with the upper bulged portion 38 of the major surface section 34 such that the lower flange 51 is piled up on the upper bulged portion 38 from the front side of the vehicle body. The rear panel stiffener 23 and the rear panel outer member 21 (more specifically, the major surface section 34) jointly form a lower closed sectional portion 62 of the rear opening 61. The lower closed sectional portion 62 has enhanced stiffness and strength because a closed cross section formed jointly by the upper stiffener 48, the vertical stiffener 49 and the outer L-shaped sectional portion 35 extends in the vehicle width direction. The lower closed sectional portion 62 forms the lower edge 54a of the rear opening 61 (opening flange 54.

As shown in FIGS. 2 and 4, the rear girder 25 is raised upward from an upper portion 21b of a lateral outer part of the rear panel outer member 21 and is formed by an inner L-shaped sectional portion (L-shaped sectional portion) 65 facing the cabin 31 and an outer L-shaped sectional portion 71 facing the outside 32 of the vehicle body.

A rear flange 67 of the inner L-shaped sectional portion 65 is joined with a rear flange 72 of the outer L-shaped sectional portion 71. Similarly, a front flange 69 of the inner L-shaped sectional portion 65 is joined with a front flange 73 of the outer L-shaped sectional portion 71. The inner L-shaped sectional portion 65 and the outer L-shaped sectional portion 71 thus joined together form a side closed sectional portion 75 extending in an up-down or vertical direction. By virtue of the side closed sectional portion 75 extending vertically and formed into a closed sectional form, the rear girder 75 has enhanced stiffness and strength.

The side closed sectional portion 75 forms a side edge 54b of the rear opening 61 (opening flange 54) of the vehicle body 11. The rear flange 72 of the outer L-shaped sectional portion 71 has a lower curved flange part 72a at a lower end thereof. As shown in FIG. 3, the lower curved flange part 72a is formed to curve toward a lateral inner side of the vehicle body. The lower curved flange part 72a has a lateral inner end thereof connected (joined) with the curved flange part 36a of the outer flange 36.

As shown in FIGS. 2 and 4, the inner L-shaped sectional portion 65 includes a girder side surface portion (side surface) 66 projecting (extending) from the opening flange 54 of the rear opening 61 toward the front side of the vehicle body, and a girder extension surface portion (extension surface) 68 bent from a front end 66a of the girder side surface 66 toward a lateral outer side of the vehicle body. The rear flange 67 of the inner L-shaped sectional portion 65 and the rear flange 72 of the outer L-shaped sectional portion 71 are joined together to thereby form the side edge 54b of the opening flange 54.

The girder extension surface 68 extends in a lateral outer direction of the vehicle body such that a second ridge line 77 is formed between the girder extension surface 88 and the front end 66a of the girder side surface 66. The second ridge line 77 is a corner projecting toward the front side of the vehicle body. Referring back to FIG. 1, an upper end 25a of the rear girder 25 is connected to the left roof rail via the left rear pillar 16.

As shown in FIGS. 2 and 3, the corner panel 27 includes an upper stiffener extension 28 laid over the rear panel outer member 21 and the rear girder 25, and a rear panel side extension 29 provided below the upper stiffener extension 28. The corner panel 27 is joined with the rear panel outer member 21 and the rear girder 25 in such a manner as to be laid over the rear panel outer member 21 and the rear girder 25, so that the rear panel outer member 21 and the corner panel 27 jointly form a corner closed sectional portion 61. The corner closed sectional portion 61 is a cross section which is continuously and curvedly interconnecting the lower closed sectional portion 62 and the side closed sectional portion 75 at a recessed corner portion 61a of the rear opening 61.

The upper stiffener extension 28 includes a curvedly formed upper flange 83, an upper curved portion 84 projecting from the upper flange 83 toward the front side of the vehicle body so as to have a curved shape, and an upper vertical portion 85 bent downward from a front end of the upper curved portion 84. A bent part between the upper curved portion 84 and the upper vertical portion 85 forms a curved third ridge line 86. The third ridge line 86 is a curved corner projecting toward the front side of the vehicle body.

As shown in FIGS. 3 and 4, the upper flange 83 is joined to a second flange 96 of the rear panel side extension 29, the rear flange 72 (lower curved flange part 72a) of the outer L-shapes sectional portion 71 and the rear flange 67 (lower end 67a) of the inner L-shaped sectional portion 65 from an upper side thereof. The second flange 96 is joined to the outer flange 36 of the major surface section 34 and the outer end 47a of the rear panel stiffener 23 (upper flange 47) from an upper side thereof. The upper flange 47 is joined to the outer flange 34 from an upper side thereof.

The upper curved portion 84 has a lateral inner end 84a joined to a lateral inner end 93a of the rear panel side extension 29 (bulkhead 93) from an upper side thereof, and a lateral outer end 84b joined to a lower end 66b of the girder side surface 66 from a lateral inner side thereof. The upper vertical portion 85 is formed into a generally triangular shape and has a plurality of upper vertical beads (vertical beads) 87 formed on a lower end 85a thereof and a gun-insertion hole 88 formed in a portion located closer to a lateral outer end 85b than to a lateral inner end thereof.

The upper vertical beads 87 are formed into a concave shape which is recessed toward the rear side of the vehicle body and which extend in the up-down direction (substantially vertical direction). By thus providing the upper vertical beads 87 on the lower end 85a of the upper vertical portion 85, it is possible to reinforce the upper vertical portion (upper stiffener extension 28).

Figure 5:
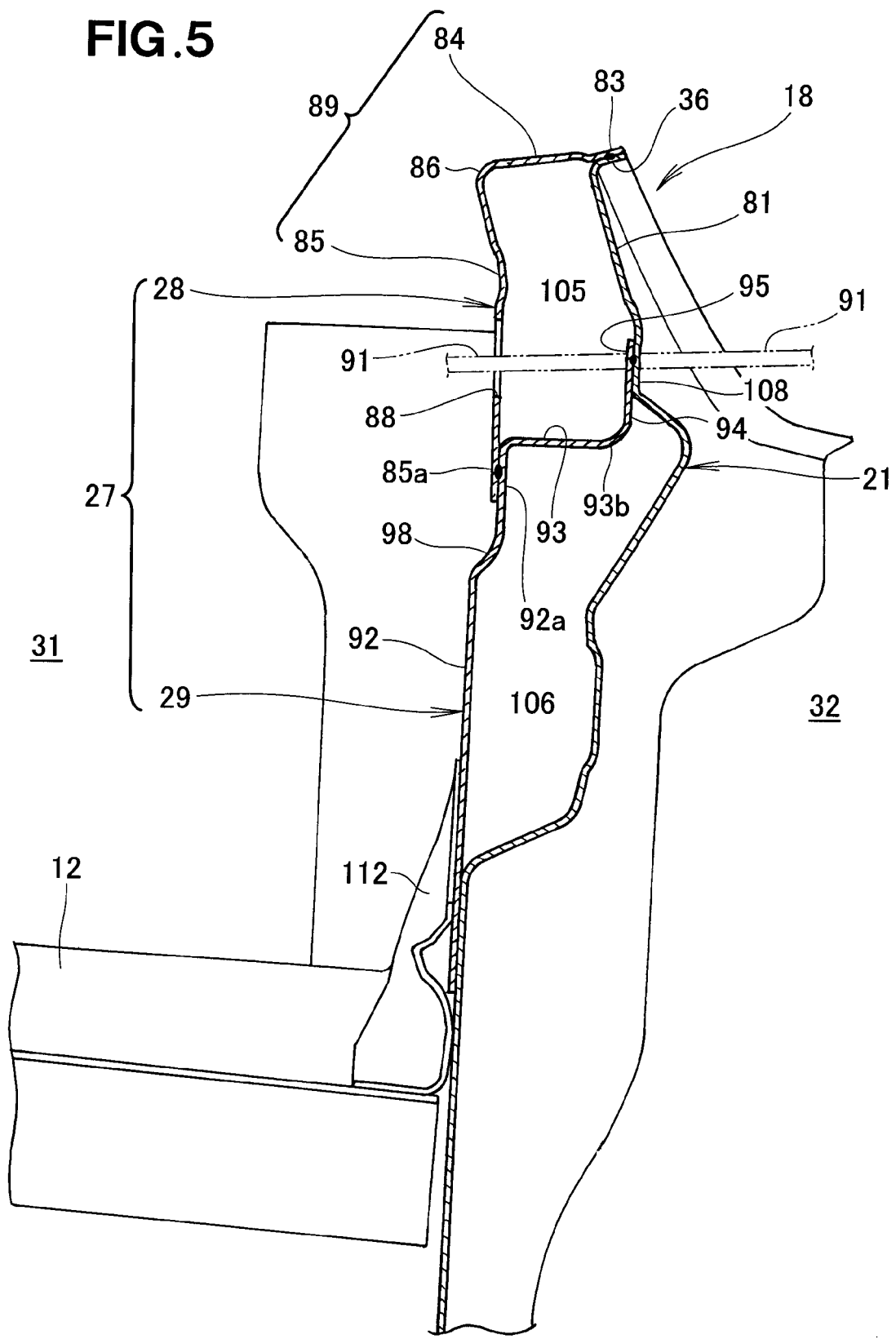
FIG. 5 is a cross-sectional view taken along line 5-5 of FIG. 2.

The gun-insertion hole 88 is provided for spot-welding the rear panel outer member 21 and the rear panel side extension 29. As shown in FIG. 5, the upper stiffener extension 28, the rear panel side extension 29 and the rear panel outer member 21 together form the corner closed sectional portion 81.

With this arrangement, an electrode 91 for the spot-welding can hardly be inserted into the interior of the corner closed sectional portion 81. The gun-insertion hole 88 is therefore formed in the upper vertical portion 85. The electrode 91 for the spot-welding is now allowed to be inserted through the gun-insertion hole 88 into the interior of the corner closed sectional portion 81. A flange joint portion 108 (described later) of the rear panel outer member 21 and a first flange 95 of the rear panel side extension 29 can be spot-welded together from the interior of the corner closed sectional portion 81.

As shown in FIGS. 3 and 4, the upper vertical portion 85 is joined at the lower end 85a thereof to an upper end 92a of the rear panel side extension 29 (side vertical portion 92) from the front side of the vehicle body. The upper vertical portion 85 has a lower half of the lateral outer end 85b joined to the bent surface section 42 of the rear panel outer member 21 from the front side of the vehicle body (also refer to FIG. 7), and an upper half of the lateral outer end 85b joined to a lower part 71a of the outer L-shaped sectional portion 71 from the front side of the vehicle body. Additionally, an upper end 85c of the upper vertical portion 85 is joined to a lower end 65a of the inner L-shaped sectional portion (extension surface portion) 65 from the front side of the vehicle body.

The upper L-shaped sectional portion (L-shaped sectional portion) 89 is formed by the upper curved portion 84 and the upper vertical portion 85. The upper L-shaped sectional portion 89 has the curved third ridge line 86. The upper stiffener extension 28 is provided with the upper L-shaped sectional portion 98 having the third ridge line 86. The upper L-shaped sectional portion 89 is provided so as to be continuous with the stiffener L-shaped sectional portion 56 and the inner L-shaped sectional portion 65. Furthermore, the third ridge line 86 is formed so as to be continuous with the first ridge line 52 and the second ridge line 77 (also refer to FIG. 2).

With this arrangement, load transmission between the rear panel stiffener 23 and the rear girder 25 can be smoothly and appropriately achieved via the upper L-shaped sectional portion 89 (third ridge line 86) of the upper stiffener extension 28. The load transmission efficiency between the rear panel stiffener 23 and the rear girder 25 increases and the rigidity and strength of the rear outer wall 18 (vehicle body rear part) can be enhanced.

The rear panel side extension 29 that forms the corner closed sectional portion 81 jointly with the upper stiffener extension 28 and the rear panel outer member 21, is provided with the bulkhead 93 (also refer to FIG. 7) which partitions the corner closed sectional portion 81 into a plurality of closed sectional parts. More specifically, the rear panel side extension 29 includes the side vertical portion 92 provided along the rear panel outer member 21 (major surface section 34 and bent surface section 42), and the bulkhead 93 bent substantially horizontally from the upper end 92a of the side vertical portion 92 toward the rear side of the vehicle body.

The rear panel side extension 29 further includes a side upstanding surface 94 bent upwardly from a rear end 93b (also refer to FIG. 5) of the bulkhead 93, the first flange 95 projecting from a lateral outer end of the side upstanding surface 94 in a laterally outward direction of the vehicle body, and the second flange 96 bent from an upper end of the side upstanding surface 94 toward the rear side of the vehicle body. A mounting bracket 112 is joined to a lower part of the rear panel side extension 29 from the front side of the vehicle body. The mounting bracket 112 is mounted to a rear end of the left rear side frame 12.

The side vertical portion 92 is formed into a generally pentagonal shape and includes a side horizontal step (horizontal step) 98 (also refer to FIG. 5) provided at an upper end 92a thereof and extending in the vehicle width direction, a plurality of side vertical beads (vertical beads) 99 provided on the upper end 92a, and a bulged portion 101 provided in a inclined manner at a lateral inner end 92b thereof.

The side horizontal step 98 is formed to be substantially horizontal and extending in the vehicle width direction. The side horizontal step 98 is horizontally aligned with the upper bent horizontal bead 43 of the bent surface section 42. The side horizontal step 96 and the upper bent horizontal bead 43 are aligned with each other in a substantially horizontal direction. By virtue of the side horizontal step 98 and the upper bent horizontal bead 43 thus arranged into horizontal alignment with each other, the rigidity and strength of the rear outer wall 18 (vehicle body rear part) can be further enhanced.

Each of the side vertical beads 99 is formed to extend in the up-down direction (substantially vertical direction) and constitutes a reinforcement portion formed into a concave shape which is recessed toward the rear side of the vehicle body so as to be fittable with a respective one of the upper vertical beads 87. When the upper vertical beads 87 are superimposed on the side vertical beads 99, each of the upper vertical beads 87 and a corresponding one of the side vertical beads 99 are coincident with each other. The plurality of side vertical beads 99 and the plurality of upper beads 87 are provided in a coincidence state in the vertical direction. With the side vertical beads 99 and the upper vertical beads 87 thus arranged into a coincidence state, a further enhancement of the rigidity and strength of the rear outer wall 18 (vehicle body rear part) can be achieved.

Figure 6:
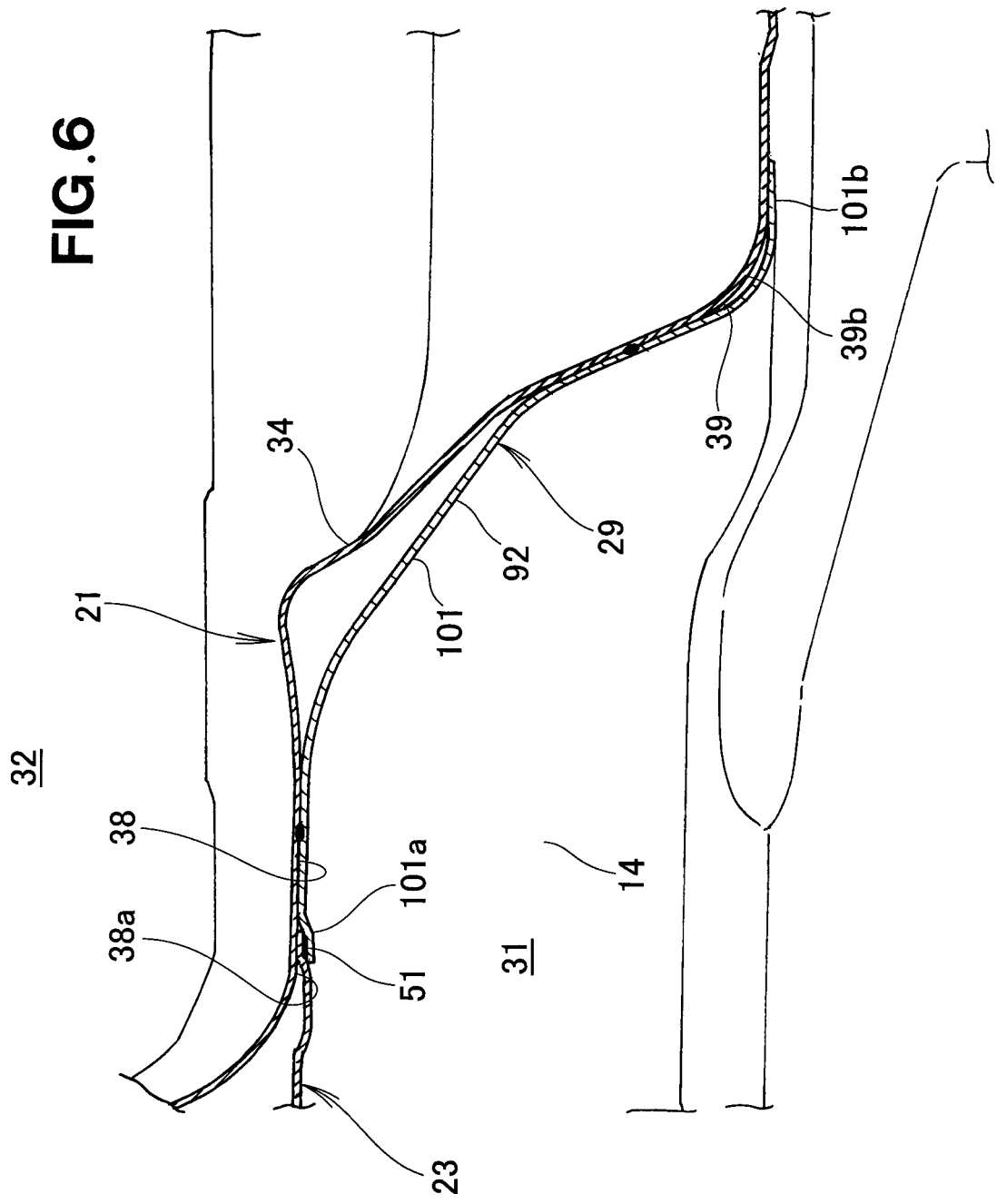
FIG. 6 is a cross-sectional view taken along line 6-6 of FIG. 4.

As shown in FIGS. 4 and 6, the bulged portion 101 has an upper end 101a joined to the upper bulged portion 38 of the rear panel outer member 21 (major surface section 34) via the lower flange 51 and a lower end 101b joined to the lower bulged portion 39 of the rear panel outer member 21. The bulged portion 101 is spanning between the upper bulged portion 38 (first outer ridge line 38a) and the lower bulged portion 39 (second outer ridge line 39a).

The bulged portion 101 extends to swell up between the first outer ridge line 38a and the second outer ridge line 39a.

With this arrangement, the bulged portion 101 is able to reinforce the first outer ridge line 38a and the second outer ridge line 39a in such a manner as to prevent the first and second outer ridge lines 38a, 39a from moving in a direction to approach each other. The rigidity and strength of the rear outer wall 18 (vehicle body rear part) can be further enhanced.

As shown in FIGS. 4 and 5, the bulkhead 93 is disposed substantially horizontally in such a manner as to be continuous with the upper stiffener 48 of the rear panel stiffener 23. By virtue of the bulkhead 93 provided substantially horizontally in contiguous relation to the upper stiffener 48, the corner closed sectional portion 81 is partitioned by the bulkhead 93 into upper and lower (plural) closed sectional parts 105, 106. With this arrangement, the corner closed sectional portion 81 (namely, the rear outer wall 18) has an enhanced yield strength against collapsing deformation, which will further increase the rigidity and strength of the rear outer wall 18 (vehicle body rear part).

The bulkhead 93 is provided as an integral part of the rear panel side extension 29. Since the corner closed sectional portion 81 is partitioned into the upper and lower (plural) closed sectional parts 105, 106 by the bulkhead 93 integrally provided on the rear panel side extension 29, it is not necessary to provide a separate bulkhead and, hence, an increase in the number of structural components can be suppressed.

Furthermore, the bulkhead 93 formed to be continuous with the upper stiffener 48 insures proper transmission of a load from the upper stiffener 48 to the bulkhead 93. With this arrangement, load transmission efficiency from the rear panel stiffener 23 to the rear panel side extension 29 can be increased, which will offer a further enhancement of the rigidity and strength of the rear outer wall 18 (vehicle body rear part).

Figure 7:
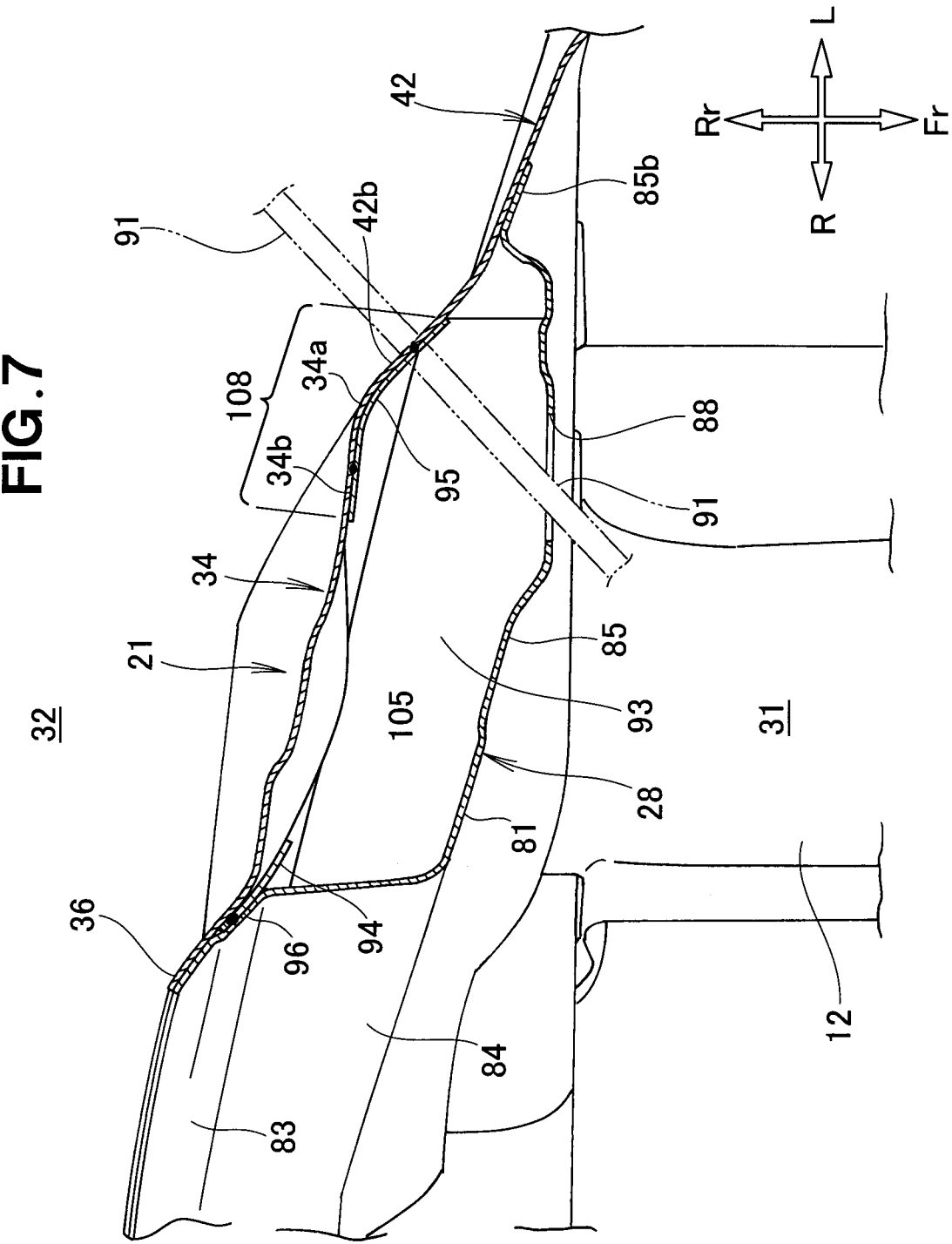
FIG. 7 is a cross-sectional view taken along line 7-7 of FIG. 2.

As shown in FIGS. 4 and 7, the first flange 95 projects from the lateral outer end of the side upstanding surface 94 in the laterally outward direction of the vehicle body. The first flange 95 is joined to the flange joint portion 108 from the front side of the vehicle body, the flange joint portion 108 being formed by a part of an upper end 34b of the major surface section 34 near the lateral outer end 34a and a part of an upper end 42b of the bent surface section 42 near the lateral outer end 34a. In other words, the first flange 95 is joined in such a manner as to extend across the upper end 34b of the major surface section 34 and the upper end 42b of the bent surface section 42. With this arrangement, since the major surface section 34 and the bent surface section 42 are reinforced by the first flange 95, a further enhancement of the rigidity and strength of the rear panel outer member 21 can be achieved.

The upper stiffener extension 28 (upper upstanding surface 85) has the gun-insertion hole 88 formed therein. This arrangement allows the electrode 91 for the spot-welding process to be inserted through the gun-insertion hole 88 into the interior of the corner closed sectional portion 81. Thus, the first flange 95 can be spot-welded to the flange joint portion 108 from the interior side of the corner closed sectional portion 81.

The second flange 96 is bent from the upper end of the side upstanding surface 94 toward the rear side of the vehicle body. The second flange 96 is joined to the outer flange 36 of the rear panel outer member 21 and the upper flange 83 of the upper stiffener extension 28 in such a state that the second flange 96 is sandwiched between the outer flange 36 and the upper flange 83. Since the second flange 96 is firmly supported by the outer flange 36 and the upper flange 83, the second flange 96 can possess an enhanced bonding strength. This arrangement leads to an enhancement of the rigidity and strength of the rear panel side extension 29. The side vertical portion 92 has a lateral outer end 92c joined to the bent surface section 42 of the rear panel outer member 21 from the front side of the vehicle body.

Figure 8:
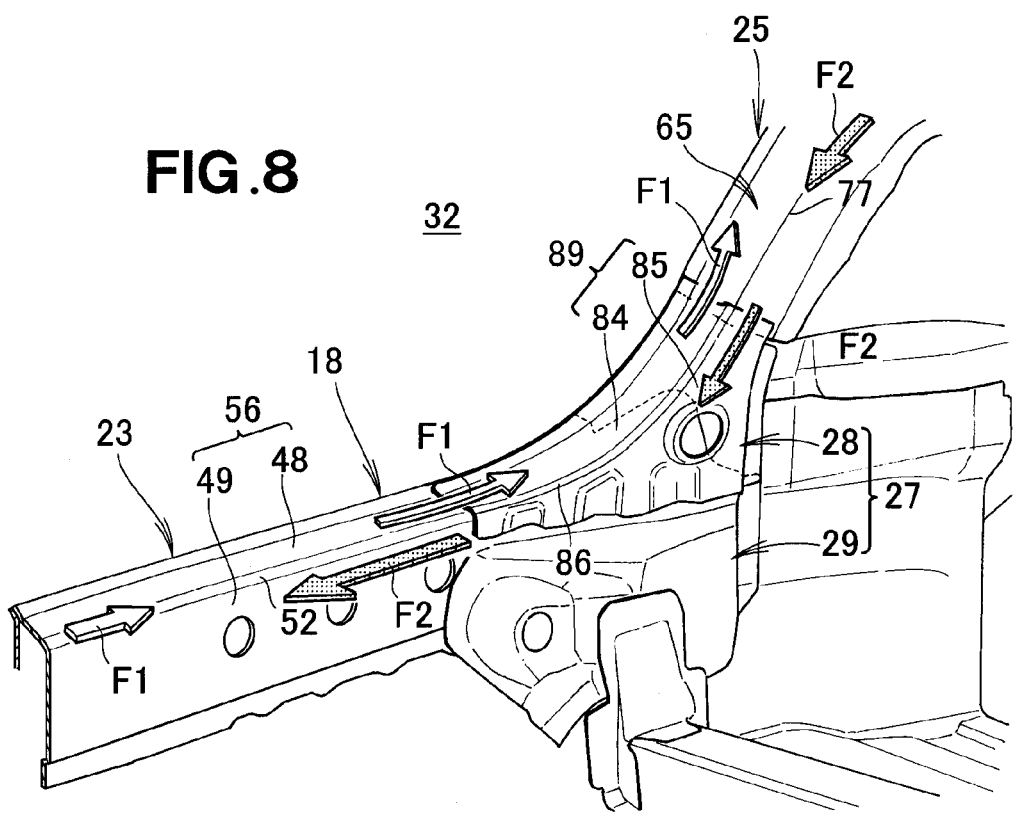
FIG. 8 is a view illustrative of the manner in which a load is transmitted between a rear panel stiffener and a rear girder of the vehicle body rear structure according to the present invention.

Next, with reference to FIG. 8, description will be made about an example in which a load is transmitted between the rear panel stiffener 23 and the rear girder 25. As shown in FIG. 8, the upper L-shaped sectional portion 89 is provided in such a manner as to be continuous with the stiffener L-shaped sectional portion 56 and the inner L-shaped sectional portion 65. Furthermore, the third ridge line 86 is formed in such a manner as to be continuous with the first ridge line 52 and the second ridge line 77.

With this arrangement, a load F1 inputted to the rear panel stiffener 23 can be smoothly and properly transmitted to the rear girder 25 successively through the first ridge line 52, the third ridge line 86 and the second ridge line 77, as indicated by unshaped arrows. Similarly, a load F2 inputted to the rear girder 25 can be smoothly and properly transmitted to the rear panel stiffener 23 successively through the second ridge line 77, the third ridge line 77 and the first ridge line 52, as indicated by shaded arrows. Thus, load transmission between the rear panel stiffener 23 and the rear girder 25 can be achieved with increased efficiency, which will contribute to an enhancement of the rigidity and strength of the rear outer wall 18 (vehicle body rear part).

Next, with reference to FIG. 9, description will be made about an example in which a load is transmitted between the rear panel stiffener 23 and the rear panel side extension 29. In the example shown in FIG. 9, the upper stiffener extension 28 is removed for facilitating easy understanding of the load transmission.

Figure 9:
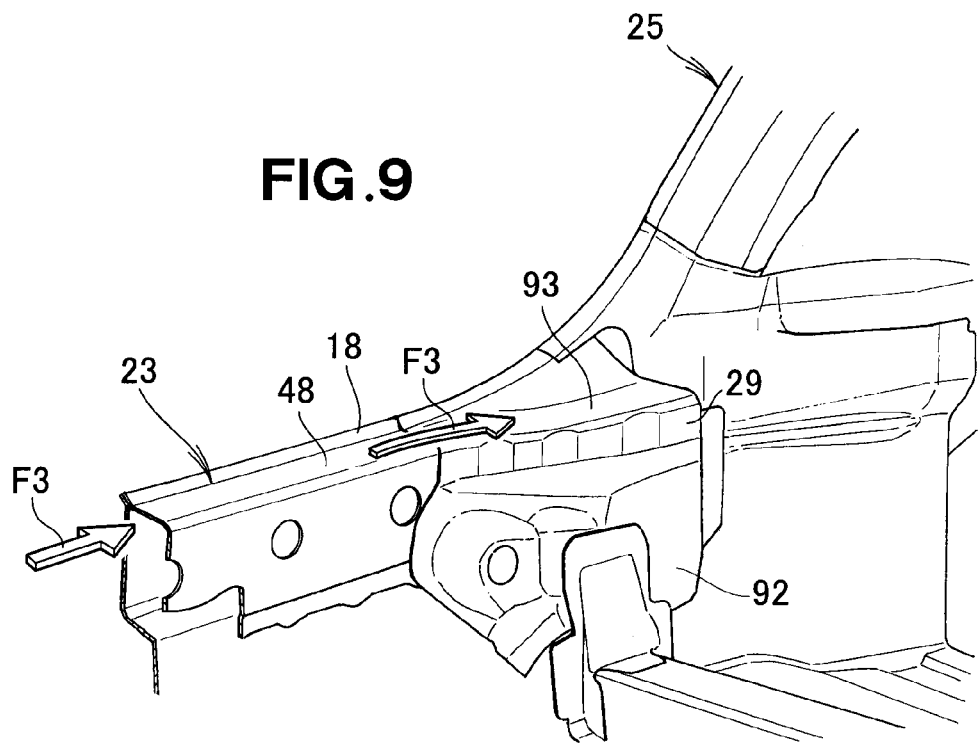
FIG. 9 is a view illustrative of the manner in which a load is transmitted between the rear panel stiffener and a rear panel side extension of the vehicle body rear structure according to the present invention.

As shown in FIG. 9, the bulkhead 93 of the rear panel side extension 29 is substantially horizontally continuous with the upper stiffener 48 of the rear panel stiffener 23. With this arrangement, a load F3 inputted to the upper stiffener 48 can be smoothly and properly transmitted to the bulkhead 93 as indicated by unshaded arrows. Thus, load transmission from the rear panel stiffener 23 to the rear panel side extension 29 can be achieved with increased efficiency, which will add to a further enhancement of the rigidity and strength of the rear outer wall 18 (vehicle body rear part). Similarly, a load (not shown) inputted to the bulkhead 93 can be smoothly and properly transmitted to the upper stiffener 48.

Figure 10:
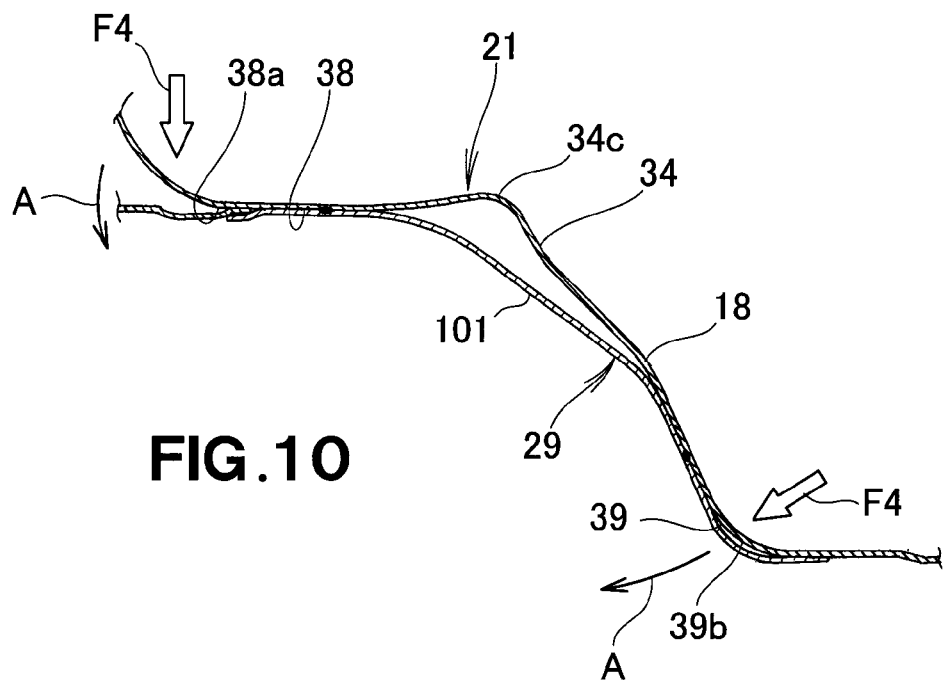
FIG. 10 is a view illustrative of the manner in which first and second outer ridge lines of a rear panel outer member is reinforced by a bulge portion of the vehicle body rear structure according to the present invention.

Next, with reference to FIG. 10, description will be made about an example in which the bulged portion 11 is reinforced by the first outer ridge line 38a and the second outer ridge line 39a of the rear panel outer member 21. As shown in FIG. 10, the major surface section 34 of the rear panel outer member 21 is bent about a bent portion 34c into a generally chevron shape. Due to this configuration, the major surface section 34 can be bent deeper about the bent portion in a direction of arrow A.

To deal with this problem, the bulged portion 101 is arranged to swell up between the upper bulged portion 38 (first outer ridge line 38a) and the lower bulged portion 39 (second outer ridge line 39a). With this arrangement, when the major surface section 34 is subjected to a load F4 tending to bend the major surface section 34 deeper in the direction of arrow A about the bent portion 34c, the first outer ridge line 38a and the second outer ridge line 39a are supported in a stretched manner by the bulged portion 101. Bending of the major surface section 34 in the direction of arrow A can thus be prevented with the result that the rigidity and strength of the rear outer wall 18 (vehicle body rear part) is further enhanced.

Figure 11:
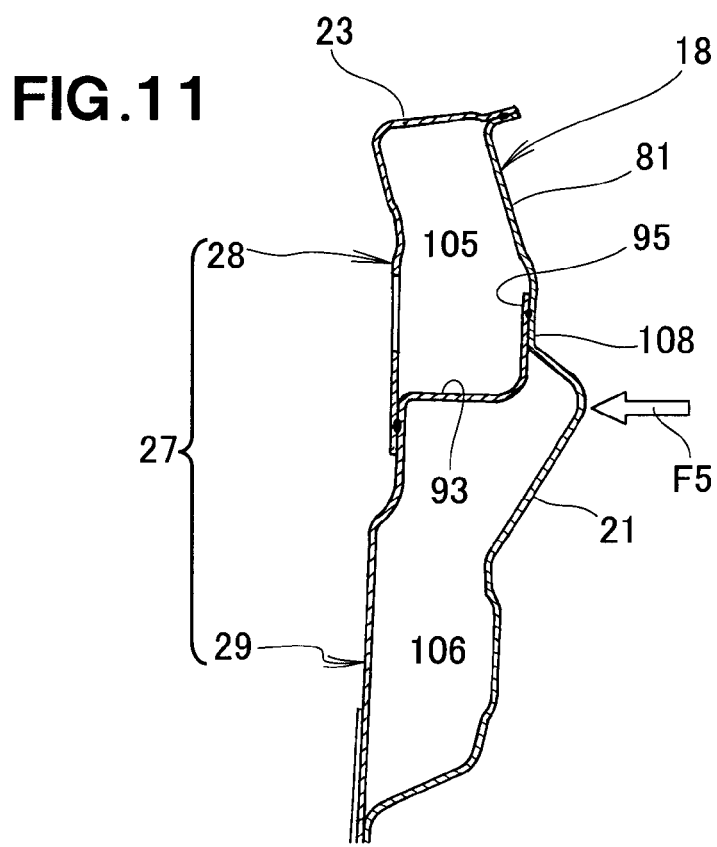
FIG. 11 is a view illustrative of the manner in which a bulkhead of a rear panel side extension presents a collapsing deformation of a rear outer wall of the vehicle body rear structure according to the present invention.

Next, with reference to FIG. 11, description will be made about an example in which collapsing deformation of the rear outer wall 18 can be prevented by the bulkhead 93 of the rear panel side extension 29. As shown in FIG. 11, the first flange 95 of the rear panel side extension 29 is welded to the flange joint portion 108 of the rear panel outer member 21 so that the corner closed sectional portion 81 is partitioned by the bulkhead 93 into the upper and lower (plural) closed sectional parts 105, 106. With this arrangement, the rear outer wall 18 (vehicle body rear part) is prevented from undergoing collapsing deformation even when a load F5 is inputted to the corner closed sectional portion 81 (i.e., the rear outer wall 18) from the rear side of the vehicle body.

The vehicle body rear structure embodying the present invention should by no means be limited to the embodiment described above but various changes and modifications are possible appropriately. For example, the shape and configuration of the vehicle body rear structure, the vehicle body, the rear outer wall, the rear panel outer member, the rear panel stiffener, the rear girder, the corner panel, the outer L-shaped sectional portion, the upper bent horizontal beads, the stiffener L-shaped sectional portion, the rear opening, the lower closed sectional portion, the inner L-shaped sectional portion, the side closed sectional portion, the corner closed sectional portion, the upper vertical beads, the gun-insertion hole, the upper L-shaped sectional portion, the bulkhead, the side horizontal step, the side vertical beads, and the bulged portion are not limited to those shown in the illustrated embodiment but can be changed appropriately.

INDUSTRIAL APPLICABILITY

The vehicle body rear structure according to the present invention is preferably suitable for application in an automobile having a rear outer wall at a vehicle body rear part, a rear girder raised upward from the rear outer wall, and a corner panel provided on a joint portion between the rear outer wall and the rear girder.

REFERENCE SIGNS LIST

10 . . . vehicle body rear structure, 11 . . . vehicle body, 14 . . . rear floor panel, 14a . . . rear end of rear floor panel, 18 . . . rear outer wall, 21 . . . rear panel outer member, 21a . . . inner surface of rear panel outer member (cabin interior surface), 23 . . . rear panel stiffener, 25 . . . rear girder, 27 . . . corner panel, 28 . . . upper stiffener extension, 29 . . . rear panel side extension, 31 . . . cabin, 32 . . . outside a vehicle (outside), 34 . . . major surface section, 55 . . . outer L-shaped sectional portion, 35a . . . upper end of outer L-shaped sectional portion, 36 . . . outer flange, 38a . . . first outer ridge line, 39a . . . second outer ridge line, 42 . . . left and right bent surface sections (bent surface sections), 43 . . . upper bent horizontal bead (horizontal bead), 48 . . . upper stiffener (upper surface), 48a . . . front end of upper stiffener, 49 . . . vertical stiffener (vertical surface), 52 . . . first ridge line, 54 . . . opening flange, 54a . . . lower edge of opening flange, 54b . . . side edge of opening flange, 56 . . . stiffener L-shaped sectional portion (L-shaped sectional portion), 61 . . . rear opening, 62 . . . lower closed sectional portion, 65 . . . inner L-shaped sectional portion (L-shaped sectional portion), 66 . . . girder side surface (side surface), 66a . . . front end of girder side surface, 68 . . . girder extension surface (extension surface), 75 . . . side closed sectional portion, 77 . . . second ridge line, 81 . . . corner closed sectional portion, 83 . . . upper flange, 86 . . . third ridge line, 97 . . . upper vertical bead (vertical bead), 88 . . . gun-insertion hole, 89 . . . upper L-shaped sectional portion (L-shaped sectional portion), 93 . . . bulkhead, 95 . . . first flange, 96 . . . second flange, 98 . . . side horizontal stepped portion (horizontal stepped portion), 99 . . . side vertical bead (vertical bead), 101: bulged portion

The invention claimed is:

1. A vehicle body rear structure comprising:
a rear panel outer member raised upward from a rear end of a floor panel of a vehicle body and forming a rear outer wall that partitions a cabin from the outside of the vehicle body;
a rear panel stiffener joined to an inner surface of the rear panel outer member so as to form, together with the rear panel outer member, a lower closed sectional portion extending in a vehicle width direction at a lower edge of a rear opening of the vehicle body;
a rear girder raised upward from a lateral outer side of the rear panel outer member and forming a side closed sectional portion extending vertically along a lateral side edge of the rear opening; and
a corner panel joined with the rear panel outer member and the rear girder so as to form a corner closed sectional portion continuously interconnecting the lower closed sectional portion and the side closed sectional portion at a recessed corner portion of the rear opening,
wherein the rear panel stiffener includes an L-shaped sectional portion formed by an upper surface extending from an opening flange of the rear opening toward a front side of the vehicle body and a vertical surface extending vertically downward from a front end of the upper surface with a first ridge line formed between the vertical surface and the front end of the upper surface,
wherein the rear girder includes an L-shaped sectional portion formed by a side surface extending from the opening flange of the rear opening toward the front side of the vehicle body, and an extension surface extending from a front end of the side surface with a second ridge line formed between the extension surface and the front end of the side surface, and
wherein the corner panel includes:
an upper stiffener extension having an L-shaped sectional portion continuous with respective L-shaped sectional portions of the rear panel stiffener and the rear girder, the L-shaped sectional portion of the upper stiffener extension having a third ridge line continuous with the first ridge line and the second ridge line; and
a rear panel side extension defining the corner closed sectional portion jointly with the upper stiffener extension and including a bulkhead partitioning the corner closed sectional portion into a plurality of closed sectional parts.

2. The vehicle body rear structure according to claim 1, wherein the bulkhead is disposed so as to be continuous with the upper surface of the rear panel stiffener.

3. The vehicle body rear structure according to claim 1, wherein the rear panel outer member includes a major surface section disposed substantially vertically, and a bent surface section disposed on a lateral outer side of the major surface section and bent from the major surface section toward the front side of the vehicle body, wherein the upper stiffener extension has a gun-insertion hole so as to allow the rear panel outer member and the rear panel side extension to be spot-welded together, and wherein the rear panel side extension has a first flange joined across the major surface section and the bent surface section.

4. The vehicle body rear structure according to claim 1, wherein the rear panel side extension has a second flange sandwiched between and joined to an outer flange at an upper end of the rear panel outer member and an upper flange of the upper stiffener extension.

5. The vehicle body rear structure according to claim 1, wherein the rear panel side extension has a horizontal step extending in the vehicle width direction, and the rear panel outer member has a horizontal bead extending in the vehicle width direction, the horizontal step and the horizontal bead being horizontally aligned with each other.

6. The vehicle body rear structure according to claim 1, wherein the upper stiffener extension has one or more vertical beads, and the rear panel side extension has a corresponding number of vertical beads, each of the vertical beads of the upper stiffener extension and a respective one of the vertical beads of the rear panel side extension being coincident with each other.

7. The vehicle body rear structure according to claim 1, wherein the rear panel outer member has a first outer ridge line extending in the vehicle width direction, and a second outer ridge line disposed below the first ridge line and extending in the vehicle width direction, and the rear panel side extension includes a bulged portion extending in such a manner as to swell up between the first outer ridge line and the second outer ridge line.

8. The vehicle body rear structure according to claim 2, wherein the rear panel outer member includes a major surface section disposed substantially vertically, and a bent surface section disposed on a lateral outer side of the major surface section and bent from the major surface section toward the front side of the vehicle body, wherein the upper stiffener extension has a gun-insertion hole so as to allow the rear panel outer member and the rear panel side extension to be spot-welded together, and wherein the rear panel side extension has a first flange joined across the major surface section and the bent surface section.

9. The vehicle body rear structure according to claim 2, wherein the rear panel side extension has a second flange sandwiched between and joined to an outer flange at an upper end of the rear panel outer member and an upper flange of the upper stiffener extension.

10. The vehicle body rear structure according to claim 3, wherein the rear panel side extension has a second flange sandwiched between and joined to an outer flange at an upper end of the rear panel outer member and an upper flange of the upper stiffener extension.

11. The vehicle body rear structure according to claim 2, wherein the rear panel side extension has a horizontal step extending in the vehicle width direction, and the rear panel outer member has a horizontal bead extending in the vehicle width direction, the horizontal step and the horizontal bead being horizontally aligned with each other.

12. The vehicle body rear structure according to claim 3, wherein the rear panel side extension has a horizontal step extending in the vehicle width direction, and the rear panel outer member has a horizontal bead extending in the vehicle width direction, the horizontal step and the horizontal bead being horizontally aligned with each other.

13. The vehicle body rear structure according to claim 4, wherein the rear panel side extension has a horizontal step extending in the vehicle width direction, and the rear panel outer member has a horizontal bead extending in the vehicle width direction, the horizontal step and the horizontal bead being horizontally aligned with each other.

14. The vehicle body rear structure according to claim 2, wherein the upper stiffener extension has one or more vertical beads, and the rear panel side extension has a corresponding number of vertical beads, each of the vertical beads of the upper stiffener extension and a respective one of the vertical beads of the rear panel side extension being coincident with each other.

15. The vehicle body rear structure according to claim 3, wherein the upper stiffener extension has one or more vertical beads, and the rear panel side extension has a corresponding number of vertical beads, each of the vertical beads of the upper stiffener extension and a respective one of the vertical beads of the rear panel side extension being coincident with each other.

16. The vehicle body rear structure according to claim 4, wherein the upper stiffener extension has one or more vertical beads, and the rear panel side extension has a corresponding number of vertical beads, each of the vertical beads of the upper stiffener extension and a respective one of the vertical beads of the rear panel side extension being coincident with each other.

17. The vehicle body rear structure according to claim 5, wherein the upper stiffener extension has one or more vertical beads, and the rear panel side extension has a corresponding number of vertical beads, each of the vertical beads of the upper stiffener extension and a respective one of the vertical beads of the rear panel side extension being coincident with each other.

18. The vehicle body rear structure according to claim 2, wherein the rear panel outer member has a first outer ridge line extending in the vehicle width direction, and a second outer ridge line disposed below the first ridge line and extending in the vehicle width direction, and the rear panel side extension includes a bulged portion extending in such a manner as to swell up between the first outer ridge line and the second outer ridge line.

19. The vehicle body rear structure according to claim 3, wherein the rear panel outer member has a first outer ridge line extending in the vehicle width direction, and a second outer ridge line disposed below the first ridge line and extending in the vehicle width direction, and the rear panel side extension includes a bulged portion extending in such a manner as to swell up between the first outer ridge line and the second outer ridge line.

20. The vehicle body rear structure according to claim 4, wherein the rear panel outer member has a first outer ridge line extending in the vehicle width direction, and a second outer ridge line disposed below the first ridge line and extending in the vehicle width direction, and the rear panel side extension includes a bulged portion extending in such a manner as to swell up between the first outer ridge line and the second outer ridge line.

* * * * *